United States Patent
Marten

(10) Patent No.: US 11,671,674 B2
(45) Date of Patent: *Jun. 6, 2023

(54) SYSTEMS AND METHODS FOR CONTROLLING CLOSED CAPTIONING

(71) Applicant: DISH Network L.L.C., Englewood, CO (US)

(72) Inventor: Neil Marten, Lakewood, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/673,654

(22) Filed: Feb. 16, 2022

(65) Prior Publication Data

US 2022/0174368 A1 Jun. 2, 2022

Related U.S. Application Data

(63) Continuation of application No. 16/570,075, filed on Sep. 13, 2019, now Pat. No. 11,290,786.

(51) Int. Cl.
*H04N 21/488* (2011.01)
*H04N 21/422* (2011.01)
(Continued)

(52) U.S. Cl.
CPC ... *H04N 21/4884* (2013.01); *H04N 21/42203* (2013.01); *H04N 21/4394* (2013.01); *H04N 21/4856* (2013.01)

(58) Field of Classification Search
CPC ......... H04N 21/4884; H04N 21/42203; H04N 21/4394; H04N 21/4856
See application file for complete search history.

(56) References Cited

U.S. PATENT DOCUMENTS 7,720,238 B2 5/2010 Tomita
8,135,147 B2 3/2012 Hong
(Continued)

FOREIGN PATENT DOCUMENTS

EP  1 681 765 A2  7/2006
EP  1 816 860 A1  8/2007
(Continued)

OTHER PUBLICATIONS

Non-Final Office Action, dated Jul. 8, 2020, for U.S. Appl. No. 16/570,075, Marten, "Systems and Methods for Controlling Closed Captioning," 34 pages.

(Continued)

*Primary Examiner* — Kyu Chae
(74) *Attorney, Agent, or Firm* — Kipman Tyler Werking; VLP Law Group LLP

(57) ABSTRACT

A system for controlling turning on and off of closed captioning receives information regarding a program content stream and automatically determines whether to turn on or off closed captioning based on thresholds being crossed regarding an estimated current loudness level of ambient noise and an estimated current loudness level of the audio of the program content stream. The estimated current loudness level of audio of the program content stream is, or is based on, one or more indications of current volume level in an audio signal representing the audio of the program content stream and current audio settings of a device outputting the audio of the program content stream. The system may estimate the loudness level of the ambient noise by use of a loudness meter that causes the ambient noise to be sampled with a microphone and a decibel level of the sampled ambient noise to be determined.

11 Claims, 8 Drawing Sheets

(51) Int. Cl.
*H04N 21/439* (2011.01)
*H04N 21/485* (2011.01)

(56) References Cited

U.S. PATENT DOCUMENTS

| | | | |
|---|---|---|---|
| 11,290,786 B2 * | 3/2022 | Marten | H04N 21/42203 |
| 2002/0124249 A1 | 9/2002 | Shintani et al. | |
| 2004/0252979 A1 | 12/2004 | Momosaki et al. | |
| 2005/0038661 A1 | 2/2005 | Momosaki et al. | |
| 2006/0044479 A1 | 3/2006 | Heo | |
| 2006/0221257 A1 | 10/2006 | Nakayama | |
| 2009/0040378 A1 | 2/2009 | Momosaki et al. | |
| 2012/0180093 A1 | 7/2012 | Ishihara et al. | |
| 2013/0302008 A1 * | 11/2013 | Kwon | H04N 21/4884 |
| | | | 386/230 |
| 2014/0184905 A1 * | 7/2014 | Mountain | H04N 21/42204 |
| | | | 348/468 |
| 2015/0178040 A1 * | 6/2015 | Kraut | H04N 21/439 |
| | | | 715/716 |
| 2016/0330396 A1 | 11/2016 | Garcia Navarro | |
| 2017/0289486 A1 * | 10/2017 | Stroffolino | H04N 5/60 |
| 2019/0306563 A1 * | 10/2019 | Chen | H04N 21/442 |
| 2020/0166639 A1 | 5/2020 | Lei et al. | |

FOREIGN PATENT DOCUMENTS

| | | |
|---|---|---|
| EP | 1 519 624 B1 | 2/2009 |
| JP | 2010-50554 A | 3/2010 |
| JP | 2012-70150 A | 4/2012 |
| JP | 2012-134931 A | 7/2012 |

OTHER PUBLICATIONS

Non-Final Office Action, dated Aug. 18, 2021, for U.S. Appl. No. 16/570,075, Marten, "Systems and Methods for Controlling Closed Captioning," 32 pages.

* cited by examiner

| Loudness Indicator Conditions | Action |
|---|---|
| Ambient Noise ≥ x dB | Turn on closed captioning |
| Audio of Program Content < y dB | Turn on closed captioning |
| Audio of Program Content dB/Ambient Noise dB < z | Turn on closed captioning |
| Audio of Program Content dB/Ambient Noise dB ≥ z | Turn off closed captioning |
| Ambient Noise < x dB and Audio of Program Content ≥ y dB | Turn off closed captioning |

*Fig. 3*

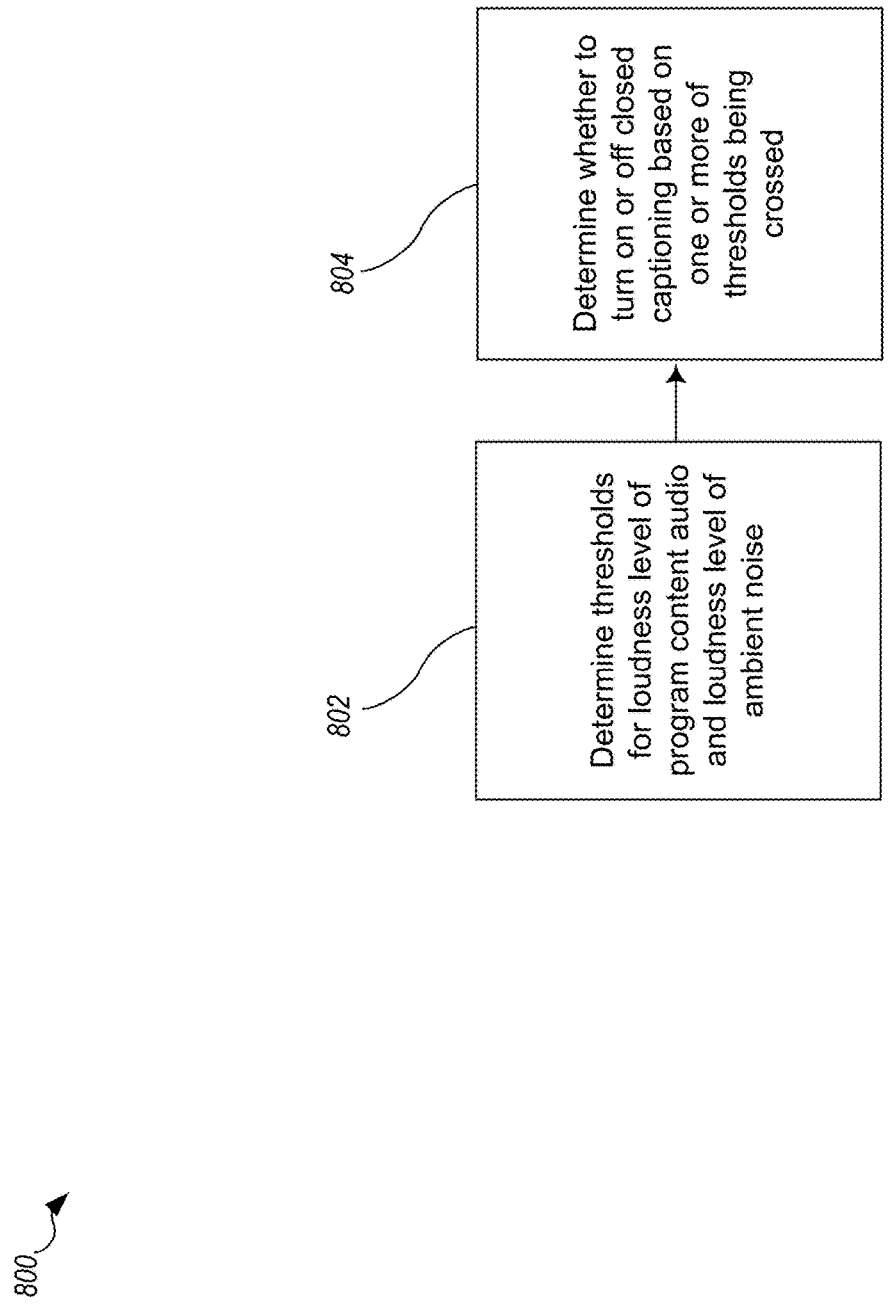

SYSTEMS AND METHODS FOR CONTROLLING CLOSED CAPTIONING

TECHNICAL FIELD

The technical field relates to the technology of closed captioning, and particularly to controlling closed captioning.

BRIEF SUMMARY

The present disclosure recognizes a technical problem of how to control closed captioning to automatically account for conditions regarding current ambient noise and program audio level without having to manually search for the closed captioning menu option and then turn on or off closed captioning each time such conditions change. Disclosed herein are systems and methods that solve this technical problem by the system receiving information regarding a program content stream and automatically determining whether to turn on or off closed captioning based on estimated loudness level of ambient noise and estimated loudness level of the audio of the program content stream. The estimated current loudness level of audio of the program content stream is, or is based on, one or more indications of current volume level in an audio signal representing the audio of the program content stream and current audio settings of a device outputting the audio of the program content stream. The system may estimate the loudness level of the ambient noise by use of a loudness meter that causes the ambient noise to be sampled with a microphone and determining a decibel level of the sampled ambient noise. The system may determine one or more thresholds for the loudness level of audio of the program content stream and the loudness level of ambient noise and determine whether to turn on or off closed captioning based on one or more of the determined thresholds being crossed.

The system may also track increases in program audio volume by the user and present one or more selectable options for automatically turning on closed captioning when the volume level is at or below the volume level immediately prior to the requested increase in volume and/or the when estimated loudness of the program audio is at or below the estimated loudness level immediately prior to the requested increase in volume. The reasoning for this is that the user will tend to increase the volume when it is too low to properly hear and understand dialogue of the program. Thus, when a volume increase request is detected, an option may be presented to the user to turn on closed captioning when the estimated loudness of the program audio is at or falls below the estimated loudness level of the program at the time when the button was pressed to increase the volume and/or when the volume level setting is at or below the volume setting at the time when the button was pressed to increase the volume. When a volume increase request is detected, an option may also be presented to the user to turn on closed captioning when the estimated loudness level of ambient noise is at or exceeds the estimated ambient noise level at the time when the button was pressed to increase the volume.

The above improves the efficiency and effectiveness of closed captioning systems by controlling the closed captioning to automatically account for such conditions without having to manually search for the closed captioning menu option and then manually turn on or off closed captioning each time such conditions change.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 3 is an example data structure including loudness indicator conditions and corresponding actions performed for controlling closed captioning, according to an example embodiment.

FIG. 8 is a flow diagram of an example method for controlling closed captioning based on thresholds being crossed, according to an example embodiment.

DETAILED DESCRIPTION

Listening conditions for television programs, movies and other video content frequently vary, even in the same location. Ambient noise (due to home appliances, road traffic and other external noise, side conversations, children, pets, etc.) as well as varying levels of program audio or dialogue loudness (such as when one turns the volume down for commercials or for another person to answer a phone call) often cause one to manually turn on closed captioning in order to understand the dialogue of the program and then turn it off when no longer needed due to such conditions changing again.

Thus, a technical problem is recognized herein of how to control the closed captioning to automatically account for such conditions without having to manually search for the closed captioning menu option and then turn on or off closed captioning each time such conditions change. Disclosed herein is a technical solution to this technical problem. In particular, the system receives information regarding a program content stream and automatically determines whether to turn on or off closed captioning based on one or more of: estimated loudness level of ambient noise and estimated loudness level of the audio of the program content stream. The system may determine one or more thresholds for the loudness level of audio of the program content stream and the loudness level of ambient noise. The system may then determine whether to turn on or off closed captioning based on one or more of the determined thresholds being crossed. This improves the efficiency and effectiveness of closed captioning systems by controlling the closed captioning to automatically account for such conditions without having to manually search for the closed captioning menu option and then manually turn on or off closed captioning each time such conditions change.

Figure 1:
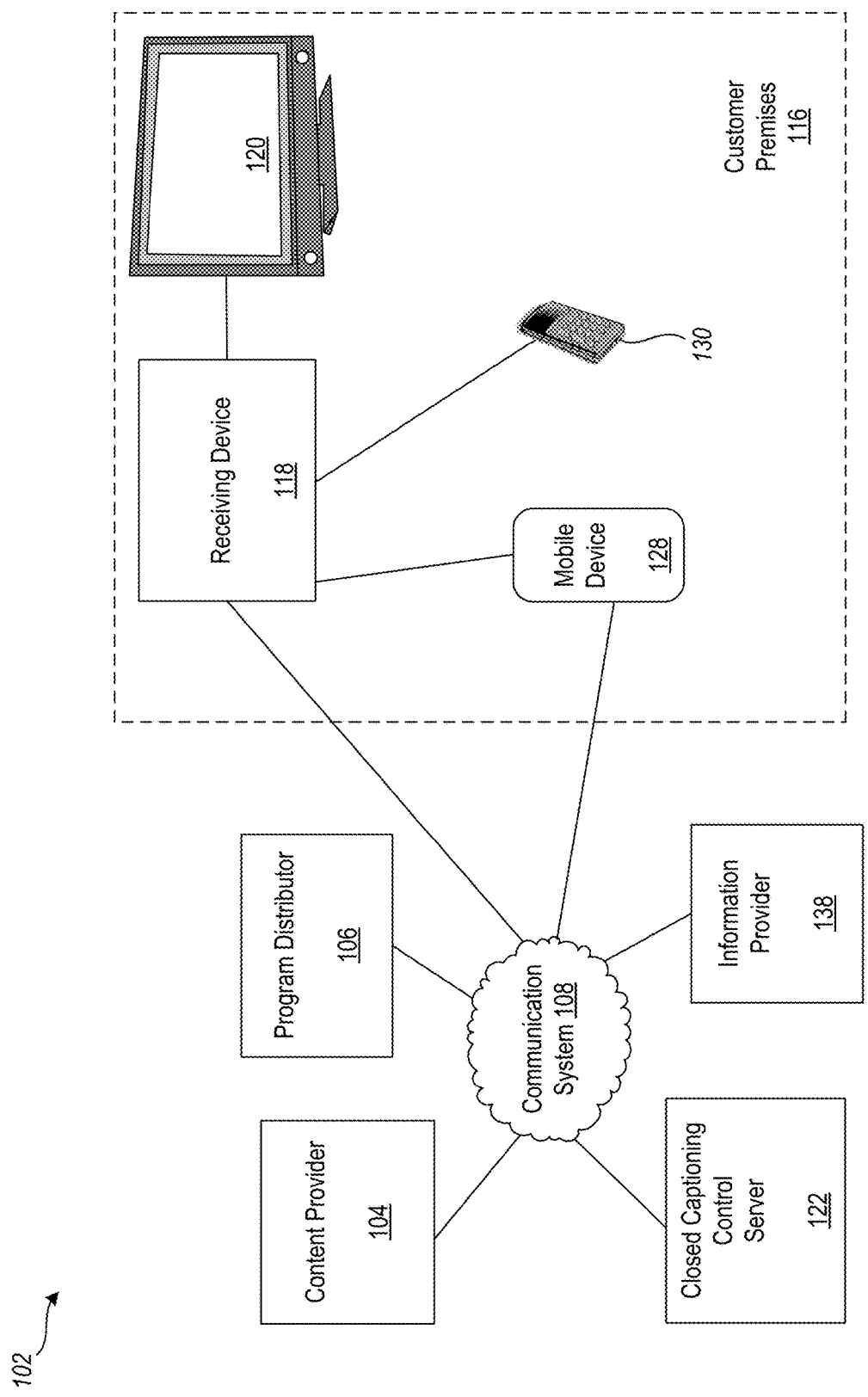
FIG. 1 is an overview block diagram illustrating a technical environment in which embodiments of systems and methods for controlling closed captioning may be implemented, according to an example embodiment.

FIG. 1 is an overview block diagram illustrating a technical environment 102 in which embodiments of systems and methods for controlling closed captioning may be implemented, according to an example embodiment.

Before providing additional details regarding the operation and constitution of systems and methods for controlling closed captioning, the example technical environment 102, within which such a system may operate, will briefly be described.

In the technical environment 102, audio, video, and/or data service providers, such as television service providers, provide their customers a multitude of video and/or data programming (herein, collectively "programming", "content"). Such programming is often provided as a program content stream for use by a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider or Internet service provider outside the customer premises 116, and to display such programming on a presentation device 120. For example, the receiving device 118 may be configured to receive, process and display on the presentation device 120 programming received directly from the satellite or cable television service provider, such as cable or satellite television broadcasts via various physical and logical channels of communication of communication system 108.

Such programming may include closed captioning. Closed captioning (CC) and subtitling (the term "closed captioning" herein encompasses subtitles) are both data and/or processes for displaying text on a television, video screen, or other visual display to provide additional or interpretive information. Closed captioning is typically used as a transcription of the audio portion of a program as it occurs (either verbatim or in edited form), sometimes including descriptions of non-speech elements, and subtitles are often a transcription or translation of the dialogue performed beforehand. Closed captions were created for deaf or hard of hearing individuals to assist in comprehension. They can also be used as a tool by those learning to read, learning to speak a non-native language, or in an environment where the audio is difficult to hear or is intentionally muted. Captions can also be used by viewers who simply wish to read a transcript along with the program audio. Other uses have been to provide a textual alternative language translation of a program's primary audio language. The term "closed" (versus "open") indicates that the captions are not visible until activated by the viewer, usually via the remote control or menu option, or by the system as disclosed herein. In many embodiments, subtitles are also selectable to be turned on or off. On the other hand, "open", "burned-in", "baked on", "hard-coded", or simply "hard" captions are always shown and visible to all viewers. Captions may also aim to describe all significant audio content—spoken dialogue and non-speech information such as the identity of speakers and, occasionally, their manner of speaking—along with any significant music or sound effects using words or symbols.

Closed captioning may be included as part of, embedded in, or along with the program content stream, such that the receiving device 118 or presentation device 120 (e.g., television) may selectively access and display the closed captioning overlaid onto or otherwise along with the video content of the program. For example, the closed captioning may include the North American EIA-608 encoding ("608 captions") that is used with NTSC-compatible video. 608 captions, which are commonly referred to as Line 21 captions, are used for closed captioning for NTSC TV analog broadcasts in the United States and Canada. 608 captions are embedded in the television signal and become visible when the viewer uses a decoder, either as a separate receiving device 118 or built into a television set, such as presentation device 120. Line 21 captions are hidden in the Line 21 data area found in the vertical blanking interval (VBI) of the television signal, which is a non-visible, active video data area. There are two fields in Line 21. Field one contains CC1, CC2, T1, and T2 (the latter being text services). Field 2 contains CC3, CC4, T3, and T4. CC1 and is most often used to carry English captions and CC3 is increasingly being used for Spanish captions and captions edited for young children's reading speed. Even though Line 21 captions are for analog broadcasts, they are also sometimes present in the picture user data in digital transmissions. 608 captions may still be supported in digital television (DTV) by carrying them inside ancillary data channels of the program content stream.

708 captions are standard closed captions used for DTV, whether that is standard-definition digital broadcasts or high-definition broadcasts. DTV does not have a vertical blanking interval (VBI) like analog video, but rather 708 captions are place into Motion Picture Expert Group (MPEG) video streams in the picture user data. Known as the DTVCC Transport Stream, the packets are in picture order, and are rearranged like picture frames are. In the fixed-bandwidth channel accessible by the receiving device 118, there is space allocated for both Line 21 and DTVCC: 960 bit/s are allocated to be compatible with Line 21 captions and 8640 bit/s is allocated for 708 captions.

The receiving device 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. In some embodiments, the presentation device 120 may also be a receiving device 118 or have a receiving device 118 integrated within it.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider or other source outside the customer premises 116 and prepare or output such programming for presentation. The receiving device 118 may often communicate that programming to another device, such as a presentation device 120. Further, the receiving device 118 may itself include user interface devices, such as buttons or switches. In some example embodiments, the receiving device 118 may be configured to receive and decrypt content and/or software or firmware updates according to various digital rights management (DRM) and other access control technologies and architectures as part of or in addition to the process of controlling closed captioning, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smartphone, mobile device or other computing device or media player, and the like. The presentation device 120 may employ a display, one or more loudspeakers, and/or other output devices to communicate video and/or audio content to a user. In some embodiments, presentation device 120 employs a microphone, keyboard, and/or other input devices to communicate commands audio, or other input to the presentation device 120 and/or receiving device 118. In many implementations, one or more presentation devices 120 reside in or near a customer premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In many embodiments, a remote-control device (remote control) 130 is operable to control the receiving device 118 and/or the presentation device 124. The remote control 130 typically communicates with the receiving device 118 using a suitable wireless medium, such as infrared (IR), radio frequency (RF), or the like. The remote control 130 may include a button or other selectable control to control the display of captions, such as a "closed captioning", "CC", "SUB" or "SUBTITLE" button. The remote control 130 may also include a microphone that may be voice or audio activated in order to receive audio, commands or other voice input. In some embodiments, such voice input may be communicated to and used by the receiving device 118, presentation device 120 and/or mobile device 128 and cause such devices to perform other actions. In various embodiments, the remote control 130 may be a voice-enabled remote and the same or different microphone of the remote control 130 may also be used to sample ambient noise and/or audio of the program content stream being output.

In the example embodiment shown in FIG. 1, handheld mobile device 128 may be communicatively connected to the television receiving device 118. For example, mobile device 128 may be a handheld mobile device of a user (e.g., a customer of a satellite, cable or streaming media subscription service associated with customer premises 116 or other user) such as a smartphone, tablet device or other computing or communications device. There may be fewer or additional mobile devices in various embodiments. The mobile device 128 may communicate over communication system 108 with the television receiving device 118, program distributor 106, content provider 104, closed captioning control server 122 and/or information provider 138 using the transmission control protocol/Internet protocol (TCP/IP) suite of networking communication protocols or other communication protocols. The mobile device 128 may also or instead communicate directly with the receiving device 118, remote control 130 and/or presentation device 120 over one or more short range wireless networks or peer-to-peer networks. In the present example, a cable or satellite television service provider may encompass or be in communication with some or all of the content provider 104, program distributor 106, closed captioning control server 122, and information provider 138.

A content provider 104 provides program content, such as television content, to a distributor, such as the program distributor 106. Example program distributors include, but are not limited to, satellite and cable television service providers. Example content providers include television stations which provide local or national broadcast television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In at least one embodiment, the received program content is converted by the program distributor 106 into a suitable signal (a "program signal") that may be ultimately communicated to the receiving device 118 as a program content stream. Various embodiments of the receiving device 118 may receive programming from program distributors 106 and/or directly from content providers 104 via locally broadcast radio, RF signals, cable, fiber optic, Internet media, or the like via the communication system 108.

In some embodiments, the receiving device 118 may be a set-top box that is typically provided by the cable provider, satellite provider, or other program distributor 106 to which the customer may subscribe to receive such television services and may also receive programming through other channels using a terrestrial, satellite signal, and/or cable television format. The mobile device 128 in communication with the receiving device 118 may be provided by the program distributor, such as a cable provider or satellite provider. However, in some instances, such a mobile device may be a device other than that provided by the program distributor 106. For example, these may include various user devices such as a tablet device, game machine, smartphone, mobile device or other computing device or media player or communications device not provided by or controlled by the cable provider, satellite provider, or other program distributor to which the customer subscribes for the television services.

The closed captioning control server 122 is operably coupled to the communication system 108 and may, in some embodiments, be a system of an entity that estimates, via communication with the receiving device 118, the loudness level of ambient noise and the loudness level of the audio of the program content stream and/or uses such estimated levels to control turning on or off the closed captioning for the receiving device 118. In some embodiments, such operations may also or instead be performed by the receiving device 118, presentation device 120, mobile device 128 and/or remote control 130.

The environment 102 may include many systems associated with a television service provider, such as the program distributor 106, that operate in a manner such as the closed captioning control server 122 described herein. The closed captioning control server 122 represents one or more of such systems in various embodiments. Such functionality may also or instead be performed by the receiving device 118, mobile device 128 and/or remote control device 130.

In addition, information provider 138 may provide various forms of content and/or services to various devices residing in the customer premises 116. For example, information provider 138 may generate and/or provide closed captions; perform closed captioning services; provide information to the receiving device 118 regarding customer or user accounts associated with the program content stream, per-user closed captions preferences and corresponding thresholds, and/or receiving device 118; provide corresponding user preferences and settings; and/or provide EPG information. Such services may include artificial intelligence and machine learning functionality to improve the user preference determination based on a feedback loop including information regarding volume control and/or closed captioning setting habits received from the receiving device 118, mobile device 128 and/or receiving devices and mobile devices of other users.

The above description of the environment 102, the customer premises 116, and the various devices therein, is intended as a broad, non-limiting overview of an example environment in which various embodiments of controlling closed captioning may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different closed captioning control servers, content providers, program distributors and information providers that operate in a corresponding manner as the closed captioning control server 122, the content provider 104, program distributor 106 and information provider 138 as described herein. Each of closed captioning control server 122, the content provider 104, program distributor 106 and information provider 138 may represent one or more of such systems in various embodiments.

Example embodiments described herein provide applications, tools, data structures and other support to implement controlling of closed captioning. Other embodiments of the described techniques may be used for other purposes, including determining acceptable ambient noise levels and program volume levels for various different listening environments. Also, controlling closed captioning may be performed by various other devices, such as audio and DVD players, digital recorders, computers, peripherals, televisions, mobile devices, virtual reality systems, active speakers, headphones, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
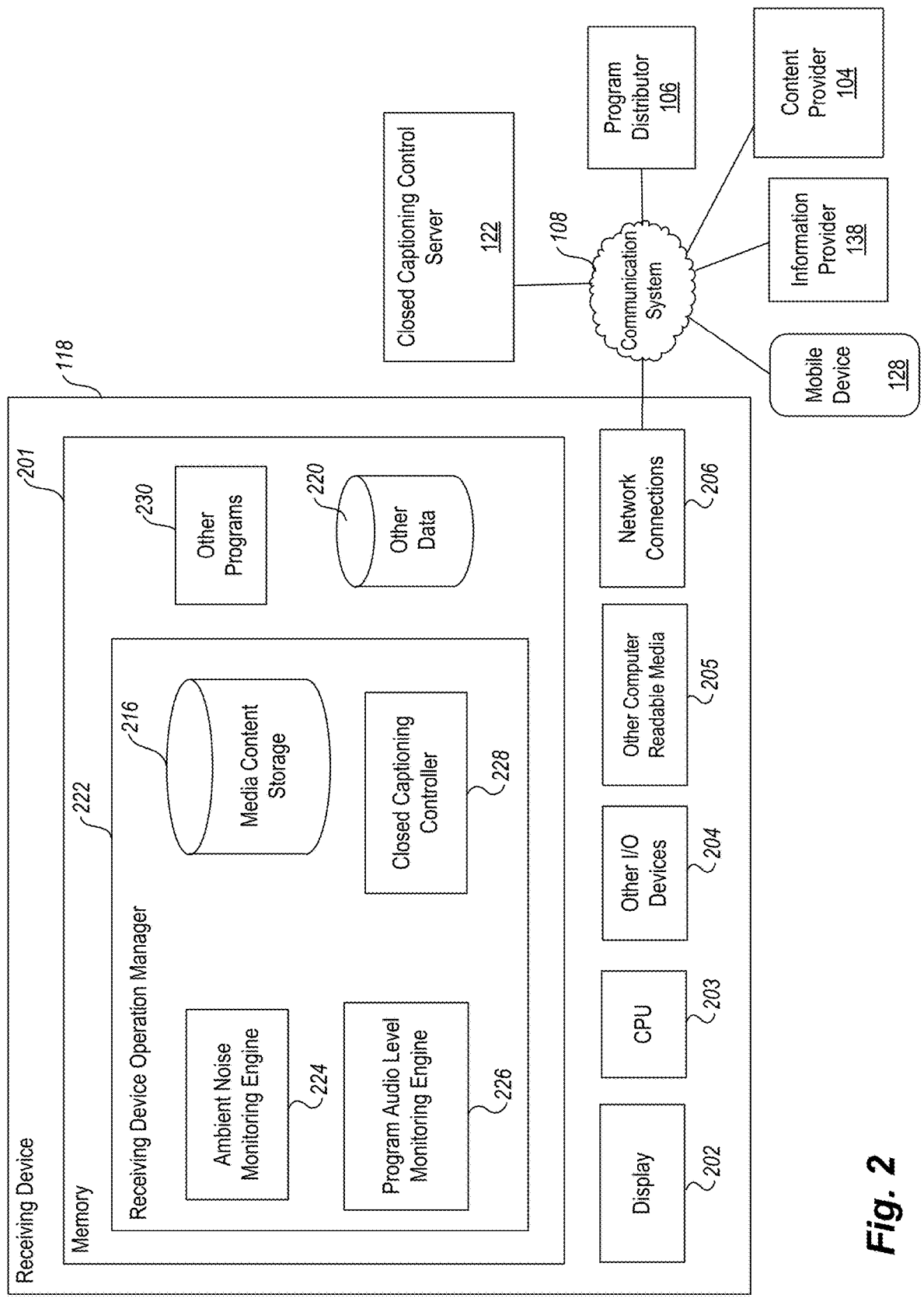
FIG. 2 is a block diagram illustrating elements of an example receiving device used in systems and methods for controlling closed captioning, according to an example embodiment.

FIG. 2 is a block diagram illustrating elements of an example receiving device 118 used in systems and methods for controlling closed captioning, according to an example embodiment.

In one embodiment, the receiving device 118 is a device such as a set-top box, television, DVR, DVD player, PC, tablet device, game machine, smartphone, mobile device or other computing device or media player configured to receive programming via a connection to a satellite or cable television service provider, or other media content provider outside the customer premises, and to display such programming on a presentation device. For example, the receiving device 118 may be configured to receive, process and display on a presentation device, such as presentation device 120 shown in FIG. 1, a program content stream, such cable or satellite television broadcasts, via various physical and logical channels of communication and/or other programming such as streaming media content.

Note that one or more general purpose or special purpose computing systems/devices may be used to operate the receiving device 118; store information regarding the receiving device 118; store metadata; perform DRM and key management operations; decrypt and encrypt received content; pair with various mobile devices on a home LAN and/or over the Internet; establish a connection between the receiving device 118 and various mobile devices; communicate data, including programming, between the receiving device 118 and various mobile devices (including mobile device 128) via a home LAN and/or Internet; and communicate with the content provider 104, program distributor 106, information provider 138 and/or closed captioning control server 122. In addition, in some embodiments, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206 (which may include one or more digital and/or analog television tuners).

The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decrypting, decoding, processing, selecting, recording, playback and displaying of programming, as well as the establishing of a connection over the home LAN and/or Internet between the receiving device 118 and various mobile devices. The components of the receiving device 118 and operation manager 222 may also execute on one or more CPUs 203 to facilitate communication of other data, including programming, between the receiving device 118 and various mobile devices via the connection over the home LAN and/or Internet, as described herein. The receiving device operation manager 222 may also facilitate on-demand media services (e.g., VOD services), closed captioning services, on-demand program ordering, processing and DRM and key management and storage corresponding to processing of received streaming media content and other programming. The receiving device operation manager 222 may operate as, be part of, or work in conjunction and/or cooperation with various broadcast television and on-demand service software applications stored in memory 201 and on various mobile devices. The receiving device operation manager 222 also facilitates communication with peripheral devices such as a remote control, via the I/O devices 204, and with the mobile device 128 and remote systems (e.g., the content provider 104, the closed captioning control server 122, the program distributor 106, and/or the information provider 138) via the network connections 206.

Recorded or buffered programming of a program content stream received as broadcast television (e.g., via one or more television tuners of network connections 206), streaming media content or other types of programming may reside on the media content storage 216, either in decrypted or encrypted form as applicable for securely storing, processing and displaying of the received media content according to the applicable DRM associated with the particular programming. The media content storage 216 may also store various generated supplemental content, program metadata associated with the recorded or buffered programming and/or supplemental content stored in the media content storage 216, such as that including, but not limited to: closed captioning data, closed captioning preference data per-user; DRM data; tags; codes, identifiers, format indicators, timestamps, user identifications, authorization codes, digital signatures, etc.

The ambient noise monitoring engine 224, is configured to estimate loudness level of ambient noise in the customer premises 116 or other listening area. Ambient noise (also referred to as background noise, reference sound, or roomnoise) is the background sound pressure level at a given location. For example, monitoring of such ambient noise may be performed via the ambient noise monitoring engine 224 controlling and/or activating one or more microphones in operable communication with the ambient noise monitoring engine 224. These microphones may be part of the I/O devices of the receiving device 118, part of the remote control 130 (shown in FIG. 1) and/or part of the mobile device 128.

In some embodiments, the ambient noise monitoring engine 224 may sample ambient noise at periodic intervals, upon command by a user, upon detecting a sudden increase is ambient noise volume, and/or when activated by a detected command to increase program volume level on the remote control 130, receiving device 118, mobile device 128 or other device. In some embodiments, the ambient noise monitoring engine 224 may include or be operably coupled to a sound level meter (also referred to as a noise level meter, sound pressure level (SPL) meter, decibel (dB) meter, or noise dosimeter). The sound level meter may use one or more microphones as described above to capture sound. The sound is then evaluated by the sound level meter and acoustic measurement values are output. The sound level meter may output ambient noise levels in terms of units of acoustic measurement for sound (e.g., in dB or in other SPL values, such as pascals). However, in some embodiments, the sound level meter also determines and/or provides the equivalent continuous sound level (Leq) and other acoustic parameters.

Since ambient noise due to home appliances, heating ventilation and air conditioning (HVAC) systems, road traffic and other external noise, side conversations, children, pets, etc., may vary in intensity and duration, the ambient noise monitoring engine 224 may sample ambient noise for varying different sample periods based on the acoustic characteristics of the noise detected. For example, if a loud conversation is detected as the cause of ambient noise, the ambient noise monitoring engine 224 may decrease the sample period and increase sample frequency due to the varying intensity and duration associated with voice conversations. Also, the ambient noise monitoring engine 224 may filter out the audio generated by the system outputting the audio of the program. For example, this may be performed by receiving or extracting directly from the program content stream the data representing the audio of the program content stream and removing or filtering out the comparable signal received from the microphone that is used to monitor the ambient noise. In various embodiments, the ambient noise monitoring engine 224 may cause the ambient noise to be sampled while the audio of the program content stream is detected as not being output by a loudspeaker that is audible to the microphone sampling the ambient noise. For example, the receiving device operation manager 222 may communicate to the ambient noise monitoring engine 224 the times at which the audio of the program content stream is not being output, such that the ambient noise monitoring engine 224 may sample ambient noise during these times.

The ambient noise monitoring engine 224 may estimate the loudness level (which, as used herein includes volume level) based on the dB levels, other SPL value level, such as pascals, and/or other acoustic parameters output from the sound meter. In some embodiments, the estimate of the loudness level of the ambient noise is the dB level, other SPL unit, such as pascals, and/or other acoustic parameters themselves output from the sound meter. The ambient noise monitoring engine 224 may then provide the estimated loudness level of the ambient noise to the closed captioning controller 228 in real time or near real time for the closed captioning controller 228 to control turning on or off the closed captioning based on the estimated loudness level of the ambient noise.

The program audio level monitoring engine 226 is configured to estimate the loudness level (the subjective perception of sound pressure) of the audio of the program content stream. This is an estimation of the loudness to the listener in customer premises 116 of the audio of the program being output by the speakers of system, which may be included in or connected to include one or more of the devices shown on the customer premises 116 in FIG. 1. Loudness estimation may be provided in terms of dB units, pascal units, another unit representing SPL, volume, or some other unit that is a function of such measured audio levels, acoustic parameters and other factors. For example, the program audio level monitoring engine 226 may estimate the loudness level of the audio of the program being output by one or more loudspeakers of the presentation device 120 and/or one or more loudspeakers connected to the receiving device 118.

The program audio level monitoring engine 226 may estimate the loudness level of the audio of the program content stream with a variety or combination of techniques. In various embodiments, the estimated loudness level of the audio of the program content stream may be, or may be based on, one or more of: one or more indications of volume level in an audio signal representing the audio of the program content stream; one or more indications of volume level in an audio signal representing the audio of the program content stream on a High Definition Multimedia Interface (HDMI) audio return channel (ARC); one or more indications of decibel level in an audio signal representing the audio of the program content stream; volume level setting of one or more devices outputting audio of the program content stream; loudspeaker sensitivity of one or more loudspeakers outputting the audio of the program content stream; amplifier power per-channel of an amplifier outputting a signal representing the audio of the program content stream; distance from one or more loudspeakers outputting the audio of the program content stream to a listening position; a number of a loudspeakers outputting the audio of the program content stream; placement of one or more loudspeakers outputting the audio of the program content stream; and sampling, via a microphone, of audio output by a loudspeaker of audio of the program content stream. The program audio level monitoring engine 226 may monitor or receive data representing one or more of the above factors and perform the estimation of loudness of the audio of the program content based on the data.

In one example embodiment, the estimated loudness level of the audio of the program content stream may be, or may be based on, one or more of: one or more indications of current volume level in an audio signal representing the audio of the program content stream and current audio settings of a device outputting the audio of the program content stream. The program content stream may include, within the program content stream, indications of current audio level, (e.g., dB level or other audio level) of the audio portion of the program content stream. For example, the audio portion of the program content stream may be or include an audio signal that contains information indicating a current volume of the audio (e.g., via measurement of or data representing amplitude of the audio signal at a current time or time period). The program content stream received by the receiving device 118 from the program distributor 106 and/or the content provider 104 may be communicated to the program audio level monitoring engine 226 from the receiving device operation manager 222. The program audio level monitoring engine 226 may extract the indications of current audio level from the received program content stream. In some embodiments, the program audio level monitoring engine 226 may be concerned with only a portion of the audio of the program content stream (such as the dialogue) and estimate the loudness level of just that relevant portion. For example, the program audio level monitoring engine 226 may estimate the loudness level and/or determine a threshold of the loudness level of a portion of the program audio based on an estimated loudness level of one of a plurality of audio channels (e.g., the center audio channel) of the program content stream to which reproduction of dialogue content of the program content stream is mostly dedicated. Thus, In some embodiments, the receiving device operation manager 222 may, in some embodiments, only send the audio signal of the audio channel that is mostly dedicated to dialogue (e.g., the center speaker audio channel) to the program audio level monitoring engine 226 for processing.

The indications of current audio level extracted from the received program content stream, combined with the current audio settings of a device currently outputting the audio of the program content stream (current volume selected by the user) may be used by the program audio level monitoring engine 226 to estimate the loudness level of the audio of the program without having to sample, via a microphone, the sound being output from the speakers. In some embodiments, the program audio level monitoring engine 226 may instead or also receive the audio signal representing the audio of the program content stream on a High Definition Multimedia Interface (HDMI) audio return channel (ARC). The program audio level monitoring engine 226 may extract one or more indications of volume level from this audio signal received on the ARC channel in order to estimate current loudness level of the audio of the program content stream.

In some embodiments, the program audio level monitoring engine 226 may also verify or supplement the estimation of the current loudness level of the audio of the program by sampling audio received at one or more microphones in operable communication with the program audio level monitoring engine 226. These microphones may be part of the I/O devices of the receiving device 118, part of the remote control 130 (shown in FIG. 1) and/or part of the mobile device 128. For example, the program audio level monitoring engine 226 may sample ambient noise at periodic intervals, upon command by a user, upon detecting that audio of the program is being output by the receiving device 118, and/or when activated by a detected command to increase program volume level on the remote control 130, receiving device 118, mobile device 128 or other device. In some embodiments, the ambient noise monitoring engine 224 may include or be operably coupled to a sound level meter to perform estimation of the loudness level of the audio of the program being output by one or more loudspeakers. Also, the program audio level monitoring engine 226 may filter out ambient noise detected by the ambient noise monitoring engine 224. For example, this may be performed by receiving from the ambient noise monitoring engine 224 the data representing the current ambient noise and removing or filtering out the comparable signal received from the microphone that is used to monitor the audio of the program being output by one or more loudspeakers.

The program audio level monitoring engine 226 may then provide the estimated loudness level of the audio of the program content stream to the closed captioning controller 228 in real time or near real time for the closed captioning controller 228 to control turning on or off the closed captioning based on the estimated loudness level of the program content stream and the estimated loudness level of the ambient noise.

The closed captioning controller 228 may receive the estimated current loudness level of the ambient noise from the ambient noise monitoring engine 224 and may receive the estimated current loudness level of the audio of the program content stream from the program audio level monitoring engine 226. In some embodiments, the closed captioning controller 228 is configured to determine whether to turn on or off closed captioning based on the estimated loudness level of ambient noise and/or the estimated loudness level of the audio of the program content stream. The closed captioning controller 228 may perform the automated turning on or turning off of closed captioning by sending the corresponding command to the receiving device operation manager 222 or other peripheral device (e.g., DVR or other media player). this command may be the same as or correspond to the command sent by the remote control 130 when the user selects the corresponding closed captioning button on the remote control 130.

For example, the closed captioning controller 228 may determine to turn on the closed captioning based on the estimated loudness level of the ambient noise meeting or exceeding a predetermined threshold. The closed captioning controller 228 may also or instead determine to turn on the closed captioning based on the estimated loudness level of the audio of the program content stream falling below another predetermined threshold. The closed captioning controller 228 may also turn off closed captioning based on various other thresholds regarding the estimated loudness level of ambient noise and/or the estimated loudness level of the audio of the program content stream. The closed captioning controller 228 may also or instead determine whether to turn on or off closed captioning based on a ratio of the estimated current loudness level of the audio of the program content stream to the estimated current loudness level of the ambient noise cross one or more thresholds.

Such thresholds may be determined based on user input indicating one or more levels for the thresholds. For example, the closed captioning controller 228 may process input from a user indicative of one or more of: a loudness level of audio of the program content stream at which to turn on or turn off closed captioning and a loudness level of ambient noise at which to turn on or turn off closed captioning. The closed captioning controller 228 then determines the thresholds based on the input. Such levels may be in terms of dB or other acoustic characteristics. In some embodiments, the user may set the threshold levels for turning on or off closed captioning by setting the volume level on the remote control 130 or other input device, such as mobile device 128, and then indicate via input to the remote control 130, receiving deice 118 and/or mobile deice 128 that the loudness level of the program audio associated with the current volume level setting is to be used as a threshold to turn on or off closed captioning.

In various embodiments, the closed captioning controller 228 may track increases in program audio volume by the user and present one or more selectable options on the presentation device 120 and/or mobile device 128 for automatically turning on closed captioning at the volume level prior to increase. For example, the closed captioning controller 228 may receive user input indicative of a volume increase for output of audio of a program content stream. In response to receiving the user input indicative of a volume increase for output of the audio of the program content stream, the closed captioning controller 228 may request and/or receive from the ambient noise monitoring engine 224 and/or program audio level monitoring engine 226 one or more of: a current loudness level of the audio of the program content stream at a time of receiving the user input indicative of the volume increase and a current loudness level of ambient noise at a time of receiving the user input indicative of the volume increase. The closed captioning controller 228 may then determine, based on the estimated one or more of current loudness level of the audio of the program content stream and current loudness level of ambient noise, one or more thresholds of one or more of: loudness level of the audio of the program content stream and loudness level of the ambient noise. The closed captioning controller 228 may then cause a selectable option to be presented to the user (e.g., on presentation device 120 and/or mobile device 128) of whether to have closed captioning turned on or off based on one or more of the determined thresholds being crossed. The closed captioning controller 228 may determine a threshold loudness level of the audio of the program content stream based on the estimated current loudness level of the audio of the program content stream at the time of receiving the user input indicative of the volume increase. Going forward, the closed captioning controller 228 may determine to turn on closed captioning based on an estimated loudness level of the audio of the program content stream falling below the threshold loudness level of the audio of the program content stream.

Other code or programs 230 (e.g., further loudness detection and/or estimation modules, audio/video processing modules, a program guide manager module, a Web server, and the like), and potentially other data repositories, such as data repository 220 for storing other data (data structures including loudness indicator conditions and corresponding actions performed for controlling closed captioning, user profiles, preferences and configuration data, etc.), may also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 include an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, a remote control 130, the mobile device 128, program distributor 106, content provider 104, information provider 138, closed captioning control server 122 or some other module. In this manner, the API may facilitate the development of third-party software, such as various different on-demand service applications, user interfaces, plug-ins, adapters (e.g., for integrating functions of the receiving device operation manager 222 and information provider 138 into mobile device and/or desktop applications), and the like to facilitate controlling closed captioning based on current ambient noise and program audio levels using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to perform: receiving information regarding a program content stream; and determining whether to turn on or off closed captioning based on estimated loudness level of ambient noise and estimated loudness level of the audio of the program content stream.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques, including but not limited to, multi-programming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

FIG. 3 is an example data structure 300 including loudness indicator conditions 302 and corresponding actions 3-4 performed for controlling closed captioning, according to an example embodiment.

In some embodiments, the closed captioning controller 228 may determine whether to turn on or off closed captioning for the current program of the program content stream being output by the receiving device 118 based on one or more determined thresholds being crossed, for example, as indicated by the loudness indicator conditions 302 shown in data structure 300. In various embodiments, the data structure 300 may be stored in data repository 220 and/or as metadata in media content storage 216 associated with the current program of the program content stream being output by the receiving device 118. The "Ambient Noise" shown in data structure 300 may be the current ambient noise level estimated by the ambient noise monitoring engine 224 (expressed in dB units) and the "Audio of Program Content" may be current loudness level of the audio of the program content stream estimated by the program audio level monitoring engine 226 (also expressed in dB units). Other SPL level units or other units represented estimated loudness level may be used in various embodiments. As shown in data structure 300, in response to the condition of Ambient Noise a threshold of x dB, the closed captioning controller 228 may cause the receiving device 118 to turn on the closed captioning. Also, in response to the condition of Audio of Program Content<a threshold of y dB, the closed captioning controller 228 may cause the receiving device 118 to turn on the closed captioning. As another example, the y threshold for the audio of the program content may be in the range of 60 to 90 dB, but may also be lower or higher. Also, the closed captioning controller 228 may determine to turn off closed captioning in response to the condition of: Ambient Noise<x dB and Audio of Program Content≥y dB. The particular threshold levels may be set by the user and/or the closed captioning controller 228 as described herein, or may be static or initial default thresholds according to levels that are considered generally too high for ambient noise or too low for audio program audio, such that closed captioning may be helpful. For example, the x threshold for ambient noise may be in the range of from 60 to 70 dB, but may also be lower or higher.

Since one's ability to hear and understand dialogue of the program may depend on the loudness level of the audio of the program content stream relative to the estimated loudness level of the ambient noise, the closed captioning controller 228 may also determine to turn on or off the closed captioning based on a ratio of the estimated loudness level of the audio of the program content stream to the estimated loudness level of the ambient noise. For example, as shown in the data structure 300, in response to the condition of Audio of Program Content dB/Ambient Noise dB<a threshold of z, the closed captioning controller 228 may cause the receiving device 118 to turn on the closed captioning. Also, in response to the condition of Audio of Program Content dB/Ambient Noise dB≥z, the closed captioning controller 228 may cause the receiving device 118 to turn off the closed captioning.

Figure 4:
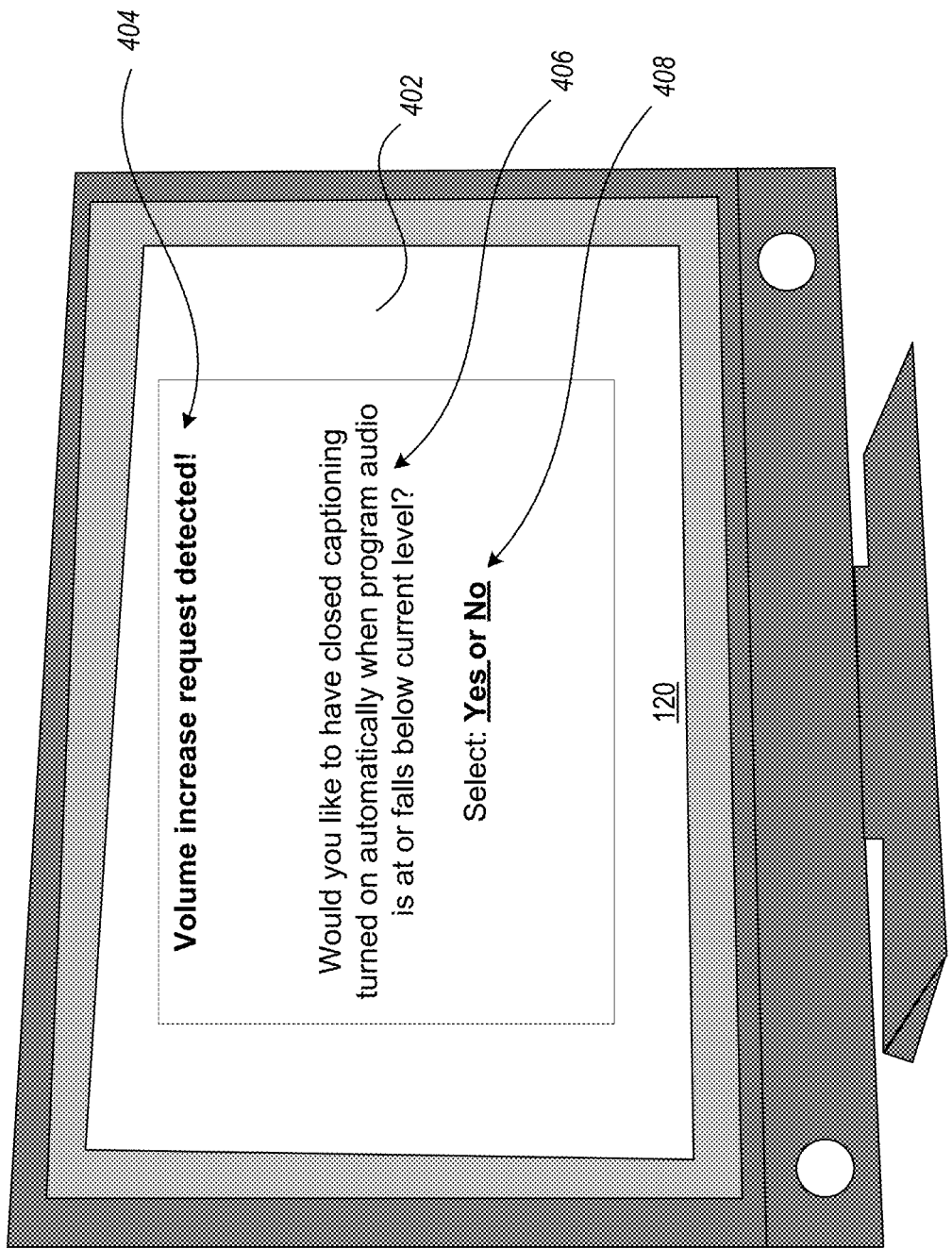
FIG. 4 is a diagram of an example presentation device having an example user interface screen including a selectable option for controlling closed captioning, according to an example embodiment.

FIG. 4 is a diagram of an example presentation device 120 having an example user interface screen 402 including a selectable option for controlling closed captioning, according to an example embodiment.

The closed captioning controller 228 may track increases in program audio volume by the user and present one or more selectable options on the presentation device 120 and/or mobile device 128 for automatically turning on closed captioning when the volume level is at or below the volume level immediately prior to the requested increase in volume and/or the when estimated loudness of the program audio is at or below the estimated loudness level immediately prior to the requested increase in volume. The reasoning for this is that the user will tend to increase the volume when it is too low to properly hear and understand dialogue of the program Thus, when a volume increase request is detected, an option may be presented to the user to turn on closed captioning when the estimated loudness of the program audio is at or falls below the estimated loudness level of the program at the time when the button was pressed to increase the volume and/or when the volume level setting is at or below the volume setting at the time when the button was pressed to increase the volume.

In the example shown in FIG. 4, the system (e.g., the closed captioning controller 228 of the receiving device 118) has detected a volume increase request by the user (e.g., by receiving a command to increase volume from the remote control device 130) and has caused a notice 404 to be presented that the volume increase request has been detected. Instead or in addition to increasing the volume, the system may present a query 406 asking the user whether the user would like to have closed captioning turned on automatically when program audio is at or falls below the current level (e.g., the estimated loudness level of the program and/or the current volume level setting at the time the button was pressed to increase the volume). A selectable option 408 is also presented which the user may select to indicate whether the user would like to have closed captioning turned on automatically when program audio is at or falls below the current level. If the user selects "Y" for yes, then, going forward, the system will have closed captioning turned on automatically when program audio is at or falls below that level. Also or instead, the system may immediately turn on the closed captioning instead of increasing the volume, which may also be an option presented to the user.

Figure 5:
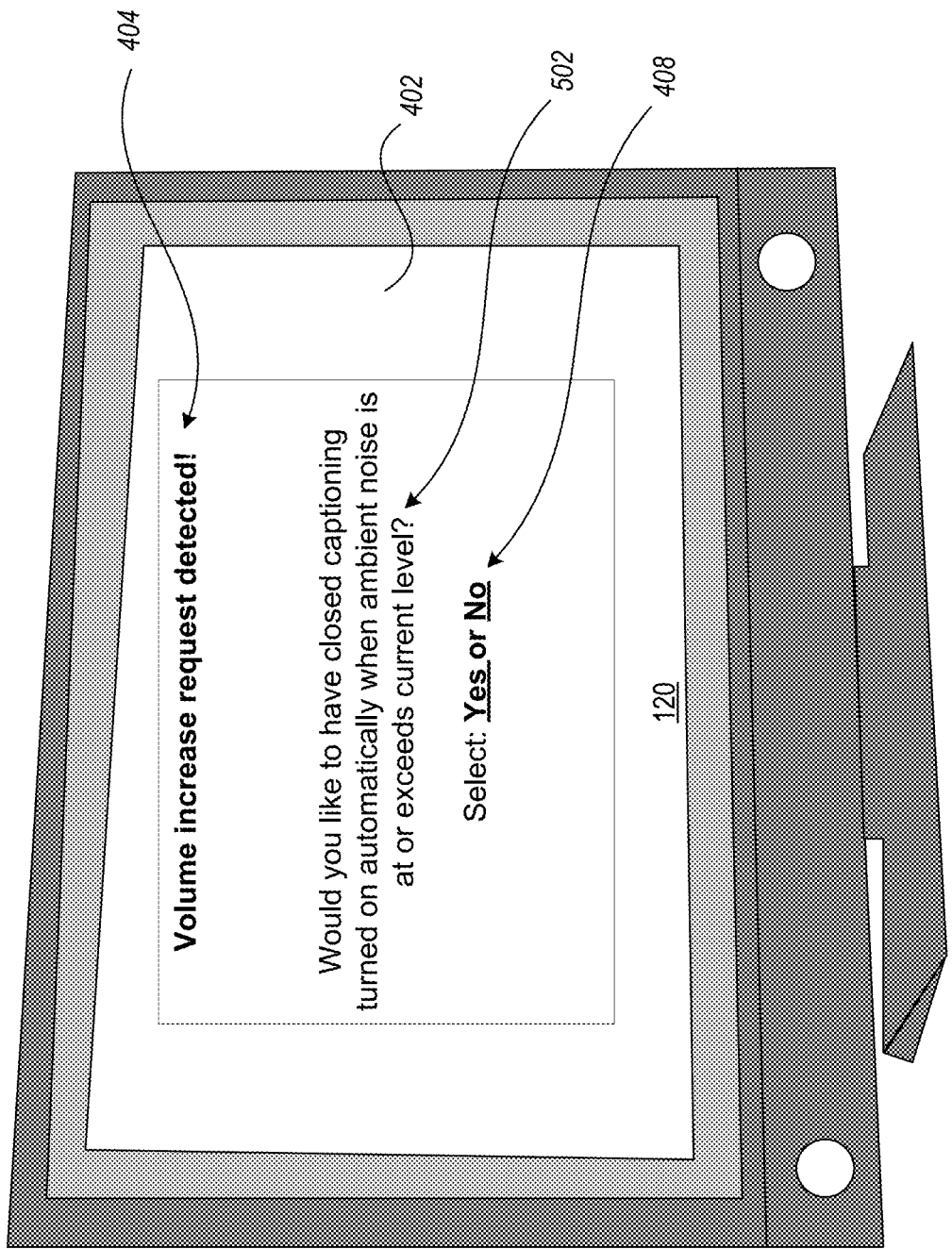
FIG. 5 is a diagram of an example presentation device having an example user interface screen including another selectable option for controlling closed captioning, according to an example embodiment.

FIG. 5 is a diagram of an example presentation device 120 having an example user interface screen 402 including another selectable option for controlling closed captioning, according to an example embodiment.

When a volume increase request is detected, an option may also be presented to the user to turn on closed captioning when the estimated loudness level of ambient noise is at or exceeds the estimated ambient noise level at the time when the button was pressed to increase the volume. In the example shown in FIG. 5, the system (e.g., the closed captioning controller 228 of the receiving device 118) has detected a volume increase request by the user (e.g., by receiving a command to increase volume from the remote control device 130) and has caused a notice 404 to be presented that the volume increase request has been detected. Instead or in addition to increasing the volume, the system may present a query 502 asking the user whether the user would like to have closed captioning turned on automatically when the ambient noise level is at or exceeds the current level (e.g., the estimated loudness of the ambient noise at the time the button was pressed to increase the volume). A selectable option 408 is also presented which the user may select to indicate whether the user would like to have closed captioning turned on automatically when the ambient noise level is at or exceeds the current level. If the user selects "Y" for yes, then, going forward, the system will have closed captioning turned on automatically when the ambient noise level is at or exceeds that level. Also or instead, the system may immediately turn on the closed captioning instead of increasing the volume, which may also be an option presented to the user.

Figure 6:
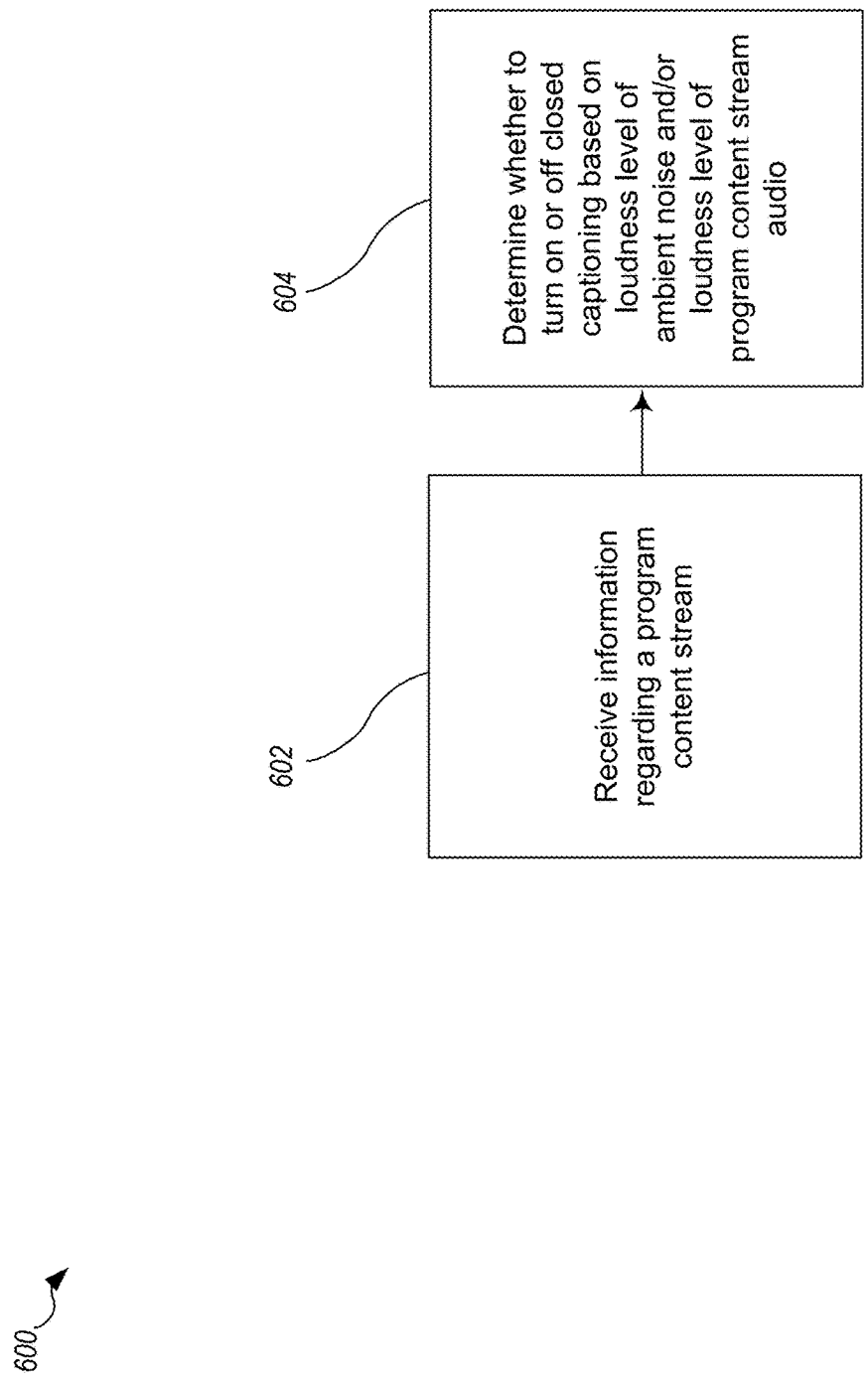
FIG. 6 is a flow diagram of an example method for controlling closed captioning, according to an example embodiment.

FIG. 6 is a flow diagram of an example method 600 for controlling closed captioning, according to an example embodiment.

At 602, a system for controlling closed captioning receives information regarding a program content stream.

At 604, the system determines whether to turn on or off closed captioning based on estimated loudness level of ambient noise and estimated loudness level of the audio of the program content stream.

Figure 7:
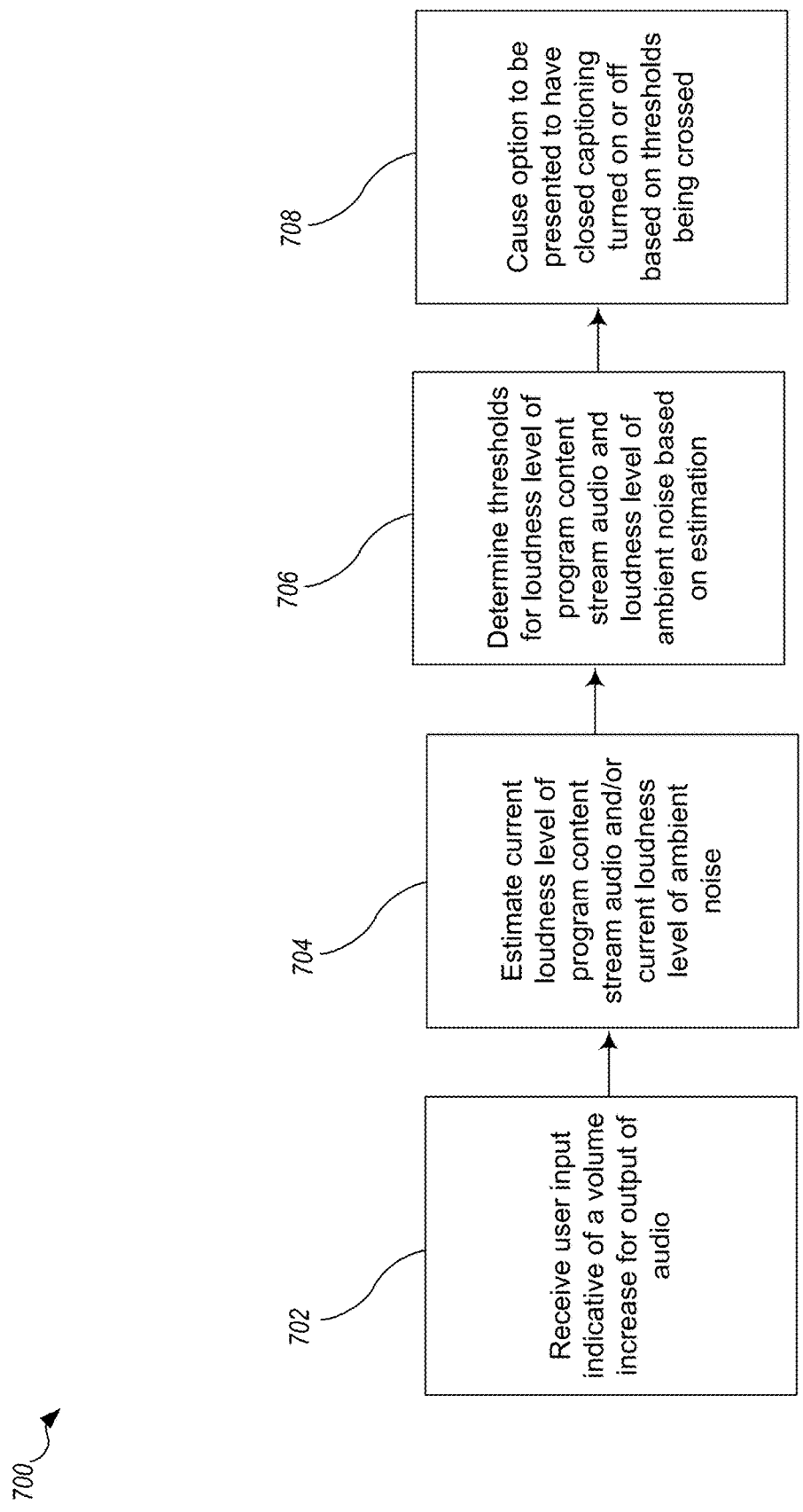
FIG. 7 is a flow diagram of an example method for causing a selectable option to be presented for controlling closed captioning, according to an example embodiment.

FIG. 7 is a flow diagram of an example method 700 for causing a selectable option to be presented for controlling closed captioning, according to an example embodiment.

At 702, a system for controlling closed captioning receives user input indicative of a volume increase for output of audio of a program content stream.

At 704, the system in response to receiving the user input indicative of a volume increase for output of the audio of the program content stream, estimates one or more of: a current loudness level of the audio of the program content stream at a time of receiving the user input indicative of the volume increase and a current loudness level of ambient noise at a time of receiving the user input indicative of the volume increase.

At 706, the system determines, based on the estimated one or more of current loudness level of the audio of the program content stream and current loudness level of ambient noise, one or more thresholds of one or more of: loudness level of the audio of the program content stream and loudness level of the ambient noise.

At 708, the system causes a selectable option to be presented to the user of whether to have closed captioning turned on or off based on one or more of the determined thresholds being crossed.

FIG. 8 is a flow diagram of an example method 800 for controlling closed captioning based on thresholds being crossed, according to an example embodiment.

At 802, a system for controlling closed captioning determines one or more thresholds of one or more of: loudness level of audio of a program content stream and loudness level of ambient noise, on which to base determination of whether to turn on or off closed captioning.

At 804, the system determines whether to turn on or off closed captioning based on one or more of the determined thresholds being crossed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for controlling closed captioning comprising:
at least one processor; and
at least one memory coupled to the at least one processor, the at least one memory having computer-executable instructions stored thereon that, when executed by the at least one processor, cause the at least one processor to:
receive user input indicative of a volume increase for output of audio of a program content stream;
in response to receiving the user input indicative of a volume increase for output of the audio of the program content stream, estimate one or more of: a current loudness level of the audio of the program content stream at a time of receiving the user input indicative of the volume increase, but before the volume is increased in response to the input, and a current loudness level of ambient noise at a time of receiving the user input indicative of the volume increase by at least causing the ambient noise to be sampled with a microphone and determining a decibel level of the sampled ambient noise;
determine, based on the estimated one or more of current loudness level of the audio of the program content stream and current loudness level of ambient noise, one or more thresholds of one or more of: loudness level of the audio of the program content stream and loudness level of the ambient noise; and
cause a selectable option to be presented to the user of whether to have closed captioning turned on or off based on one or more of the determined thresholds being crossed;
wherein one of a plurality of audio channels of the program content stream to which reproduction of dialogue content of the program content stream is mostly dedicated is a center audio channel.

2. The system of claim 1 wherein:
the determining one or more thresholds includes determining a threshold loudness level of the audio of the program content stream based on the estimated current loudness level of the audio of the program content stream at the time of receiving the user input indicative of the volume increase; and
the determining whether to turn on or off closed captioning includes determining to turn on closed captioning based on an estimated loudness level of the audio of the program content stream at a time after receiving the user input indicative of a volume increase falling below the threshold loudness level of the audio of the program content stream.

3. The system of claim 2 wherein the computer-executable instructions, when executed by the at least one processor, further cause the at least one processor to:
process input indicative of a selection of the user to have closed captioning turned on or off based on one or more of the determined thresholds being crossed; and
determine whether to turn on or off closed captioning based on one or more of the determined thresholds being crossed.

4. A non-transitory computer readable storage medium having computer executable instructions thereon that, when executed by at least one computer processor, cause the at least one computer processor to cause a noise canceling system to:
determine one or more thresholds of one or more of: loudness level of audio of a program content stream and loudness level of ambient noise, on which to base determination of whether to turn on or off closed captioning, wherein the determining of the one or more thresholds includes:
processing input from a user indicative of one or more of: a loudness level of audio of the program content stream at which to turn on or turn off closed captioning and a loudness level of ambient noise at which to turn on or turn off closed captioning, wherein the loudness level of audio of the program content stream is, or is based on, at a time associated with receiving the input from the user, but before volume is increased in response to the input, one or more indications of current volume level in an audio signal representing the audio of the program content stream and current audio settings of a device outputting the audio of the program content stream, wherein the loudness level of ambient noise is determined by causing the ambient noise to be sampled with a microphone and determining a decibel level of the sampled ambient noise;
determining the one or more thresholds based on the input; and
determining whether to turn on or off closed captioning based on one or more of the determined thresholds being crossed;
wherein one of a plurality of audio channels of the program content stream to which reproduction of dialogue content of the program content stream is mostly dedicated is a center audio channel.

5. The non-transitory computer readable storage medium of claim 4 wherein the computer-executable instructions, when executed by the at least one computer processor, further cause the at least one processor to:
cause a selectable option to be presented to the user of whether to have closed captioning turned on or off based on one or more of the determined thresholds being crossed; and
process input indicative of a selection of the user to have closed captioning turned on or off based on one or more of the determined thresholds being crossed.

6. The non-transitory computer readable storage medium of claim 5 wherein the computer-executable instructions, when executed by the at least one computer processor, further cause the at least one processor to:
determine that one or more of the determined thresholds has been crossed; and
turn on or off closed captioning based on the determination that one or more of the determined thresholds has been crossed.

7. The non-transitory computer readable storage medium of claim 4 wherein the loudness level of ambient noise is based on, at a time associated with receiving the input from the user, a measured current decibel level of the ambient noise.

8. The non-transitory computer readable storage medium of claim 4 wherein closed captioning is embedded within the program content stream.

9. A method for controlling closed captioning comprising:
receiving user input indicative of a volume increase for output of audio of a program content stream;
in response to receiving the user input indicative of a volume increase for output of the audio of the program content stream, estimating one or more of: a current loudness level of the audio of the program content stream at a time of receiving the user input indicative of the volume increase, but before the volume is increased in response to the input, and a current loudness level of ambient noise at a time of receiving the user input indicative of the volume increase by at least causing the ambient noise to be sampled with a microphone and determining a decibel level of the sampled ambient noise;
determining, based on the estimated one or more of current loudness level of the audio of the program content stream and current loudness level of ambient noise, one or more thresholds of one or more of: loudness level of the audio of the program content stream and loudness level of the ambient noise; and
causing a selectable option to be presented to the user of whether to have closed captioning turned on or off based on one or more of the determined thresholds being crossed;
wherein one of a plurality of audio channels of the program content stream to which reproduction of dialogue content of the program content stream is mostly dedicated is a center audio channel.

10. The method of claim 9 wherein:
the determining one or more thresholds includes determining a threshold loudness level of the audio of the program content stream based on the estimated current loudness level of the audio of the program content stream at the time of receiving the user input indicative of the volume increase; and
the determining whether to turn on or off closed captioning includes determining to turn on closed captioning based on an estimated loudness level of the audio of the program content stream at a time after receiving the user input indicative of a volume increase falling below the threshold loudness level of the audio of the program content stream.

11. The method of claim 10, further comprising:
processing input indicative of a selection of the user to have closed captioning turned on or off based on one or more of the determined thresholds being crossed; and
determining whether to turn on or off closed captioning based on one or more of the determined thresholds being crossed.

* * * * *